W. S. HAMM & B. W. SEIDEL.
SOLDER DISTRIBUTER.
APPLICATION FILED APR. 24, 1916.

1,258,673.

Patented Mar. 12, 1918.

Inventors:
William S. Hamm.
Bruno W. Seidel.
By Gibson Gibson Att'ys.

UNITED STATES PATENT OFFICE.

WILLIAM S. HAMM, OF HUBBARD WOODS, AND BRUNO W. SEIDEL, OF CHICAGO, ILLINOIS, ASSIGNORS TO THE ADAMS & WESTLAKE COMPANY, OF CHICAGO, ILLINOIS, A CORPORATION OF ILLINOIS.

SOLDER-DISTRIBUTER.

1,258,673.                Specification of Letters Patent.       Patented Mar. 12, 1918.

Application filed April 24, 1916.   Serial No. 93,168.

*To all whom it may concern:*

Be it known that we, WILLIAM S. HAMM, of Hubbard Woods, county of Cook, and State of Illinois, and BRUNO W. SEIDEL, of Chicago, county of Cook, and State of Illinois, citizens of the United States, have invented, jointly, certain new and useful Improvements in Solder-Distributers, of which the following is a specification, and which are illustrated in the accompanying drawings, forming a part thereof.

The invention relates to devices for delivering pieces of solder to a joint to be united while the parts to be soldered are retained in a suitable holder; and it consists in a structure such as is hereinafter described and as illustrated in the accompanying drawings, in which—

Figure 1:
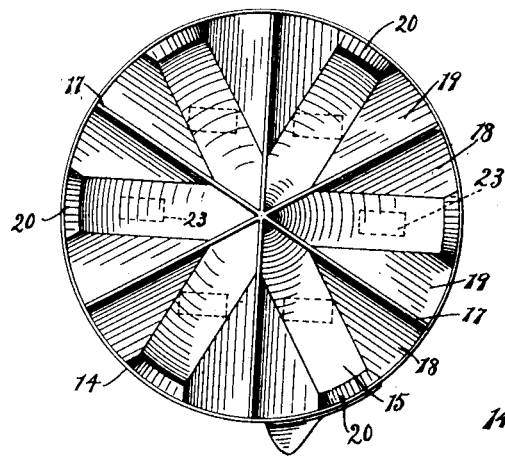
Figure 1 is a plan view of the device, the relation of the feeding conduits being indicated in dotted lines.
Figure 2:
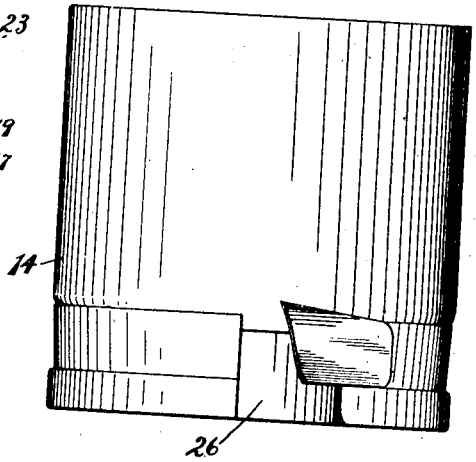
Fig. 2 is a side elevation of the device.

The device is especially adapted for use for delivering solder to a joint to be formed between a cylinder 10 and a band 11 applied to one end thereof, these two parts being secured in a holder 12 which receives the particles of solder 13 and retains them until the subsequent melting operation is performed.

The distributer comprises a cylindrical casing 14, adapted to fit loosely over the holder 12, and extend upwardly therefrom, and being open at the top. Centrally within this casing there is a dome-shaped or conical element 15, the lower portion of which assumes the cylindrical form, as shown at 16, and its lower margin terminating a short distance above the joint to which the solder is to be delivered,—the cylindrical portion being spaced apart from the casing 14 to permit passageways for the solder.

Partitions 17 extend radially from the center of the dome 15, and project somewhat above it, to the walls of the casing 14, and flare downwardly, as shown at 18, 19, terminating at the top of the cylindrical portion 16 of the dome. Adjacent partitions with the inclined portion of the dome inclosed therebetween form a chute for delivering the solder and directing it outwardly, dropping it between the cylindrical member 10 and the casing 14, and into a pocket at the top of the joint which is to unite the cylinder 10 and band 11 and formed between this cylinder and the flaring top of the holder 12.

Figure 3:
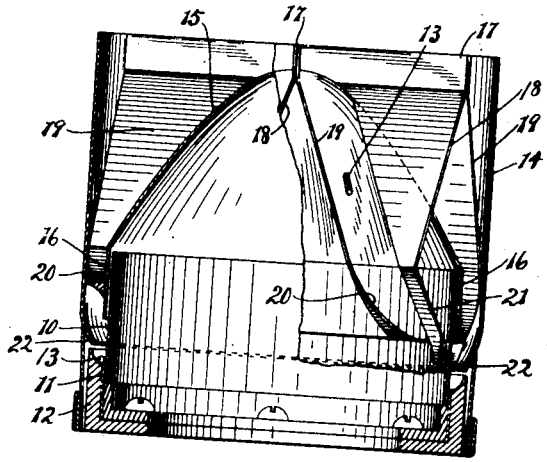
Fig. 3 is a central vertical section of the device and of the form to be soldered and the holder therefor, some portions being shown in elevation.
Figure 4:
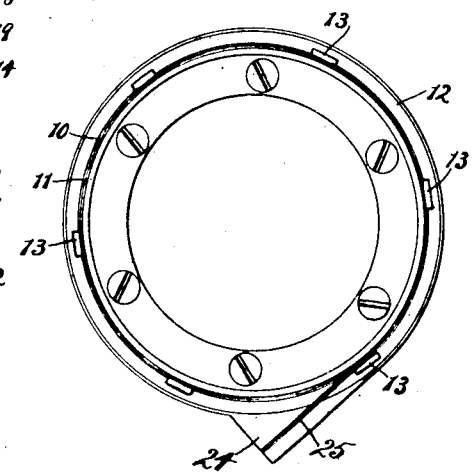
Fig. 4 is a plan view of the forms to be soldered and their holder, after the solder has been delivered thereto.

The solder employed is in wire form, cut into short lengths or bars, as indicated in Fig. 4. In order to insure the delivery of these small pieces of solder to the pocket provided to receive them, and to insure their distribution at substantially uniform distances apart, guide ribs are formed between the cylindrical portion 16 of the dome 15 and the walls of the casing 14, these ribs forming continuations of the partition sections 18, 19. Preferably the ribs of each pair, as 20, 21, are inclined in the same direction from the perpendicular. The rib 20, which is inclined across the throat of the chute through which the solder descends, terminates at the lower margin of the cylindrical portion 16 of the dome, and may be slightly transversely inclined toward this cylinder 16, as shown in Fig. 3, tending to deflect the solder bar inwardly as well as the rib 21. The companion rib 21 is continued downward and terminates substantially at the top of the holder 12. An annular instanding and downwardly inclined flange 22 is formed on the inner wall of the casing 14, its lower margin resting upon the upper edge of the holder 12.

The number of partitions 17 employed, and guide ribs 20, 21, associated therewith, will depend upon the number of solder bars it may be desired to deliver to the forming joint. Six such partitions are shown in the drawings.

The device is intended for use with a solder cutter, not shown, which will discharge the particles of solder into the several chutes through conduits, indicated at 23 in Fig. 1. Particles of solder dropped from these conduits slide down the inclined wall of the dome 15, as indicated in Fig. 3, strike the curved rib 20 and are deflected thereby against the prolonged rib 21 and deposited within the pocket at the top of the forming joint, the flange 22 preventing them from being accidentally lodged upon the upper margin of the holder 12.

The holder 12, shown in the drawings, being provided with a radial boss 24, channeled, as shown at 25, to receive a loose end of the band 11, the casing 14 is laterally apertured at its lower end, as shown at 26, to conform thereto.

We do not desire to be limited to the details of construction of the device, as various changes can be made without departing from the scope of the invention. While we have shown a dome-shaped element which forms the bottoms of the distributing chutes, the dome conformation is not essential to the performance of its function in this regard, the apex or center of the dome or cone 15 not contributing to the guiding action.

The general outlines of the structure will, of course, depend upon the shape of the sheet metal forms which are to be soldered together, and changes in the configuration of the holder for these sheet metal forms may involve changes in the details of the distributing device.

We claim as our invention—

1. In a device of the kind described, in combination, a cylindrical casing, a cone-shaped element within the casing and spaced apart therefrom at its lower margin, radial partitions extending from the cone to the casing, each partition having downwardly flaring walls.

2. In a device of the kind described, in combination, a cylindrical casing, a cone-shaped element within the casing, the lower portion of such element being cylindrical and spaced apart from the casing, radial partitions extending from the cone to the casing, the walls of such partitions flaring downwardly, and guide ribs extending downwardly from the lower end of each partition wall.

3. In a device of the kind described, in combination, a cylindrical casing, a cone-shaped element within the casing, the lower portion of such element being cylindrical and spaced apart from the casing, radial partitions extending from the cone to the casing, the walls of such partitions flaring downwardly, and guide ribs extending downwardly from the lower end of each partition wall, alternate ribs extending below the bottom margin of the cylindrical portion of the conical element.

4. In a device of the kind described, in combination, a cylindrical casing, a cone-shaped element within the casing, the lower portion of such element being cylindrical and spaced apart from the casing, radial partitions extending from the cone to the casing, the walls of such partitions flaring downwardly, guide ribs extending downwardly from the lower end of each partition wall, alternate ribs extending below the bottom margin of the cylindrical portion of the conical element, and an instanding and downwardly inclined circumferential flange on the casing below the conical element.

5. In a device of the character described, in combination, a pair of walls spaced apart, partitions uniting such walls and arranged in downwardly converging pairs, and an instanding and downwardly inclined flange on one of the walls and extending below the margin of the other wall.

6. In a device of the character described, in combination, a pair of upstanding walls, spaced apart, one thereof being inclined downwardly toward and terminating above the bottom of the other wall, partitions uniting the two walls and arranged in pairs converging downwardly, and an instanding flange on the vertical wall below the lower margin of the inclined wall.

7. In a device of the character described, in combination, a pair of upstanding walls spaced apart, one thereof being inclined downwardly toward and terminating above the bottom of the other wall, partitions uniting the two walls and arranged in pairs converging downwardly, and an instanding flange on the vertical wall below the lower margin of the inclined wall, some of the partitions extending across such flange.

8. In a device of the kind described, in combination, a holder for sheet metal forms to be soldered configured to provide with the form held a channel for receiving solder, and a casing adapted to fit over the holder and having solder-conveying conduits leading to the channel.

9. The combination with a holder for sheet metal forms to be soldered, configured to provide with the form held a channel for receiving pieces of solder in solid form and retaining the same until melted, of means for delivering such pieces of solder to the channel at regulated distances apart.

WILLIAM S. HAMM.
BRUNO W. SEIDEL.